Jan. 30, 1923.
D. T. PHILLIPS.
GRAIN BIN.
FILED APR. 28, 1919.
1,443,500
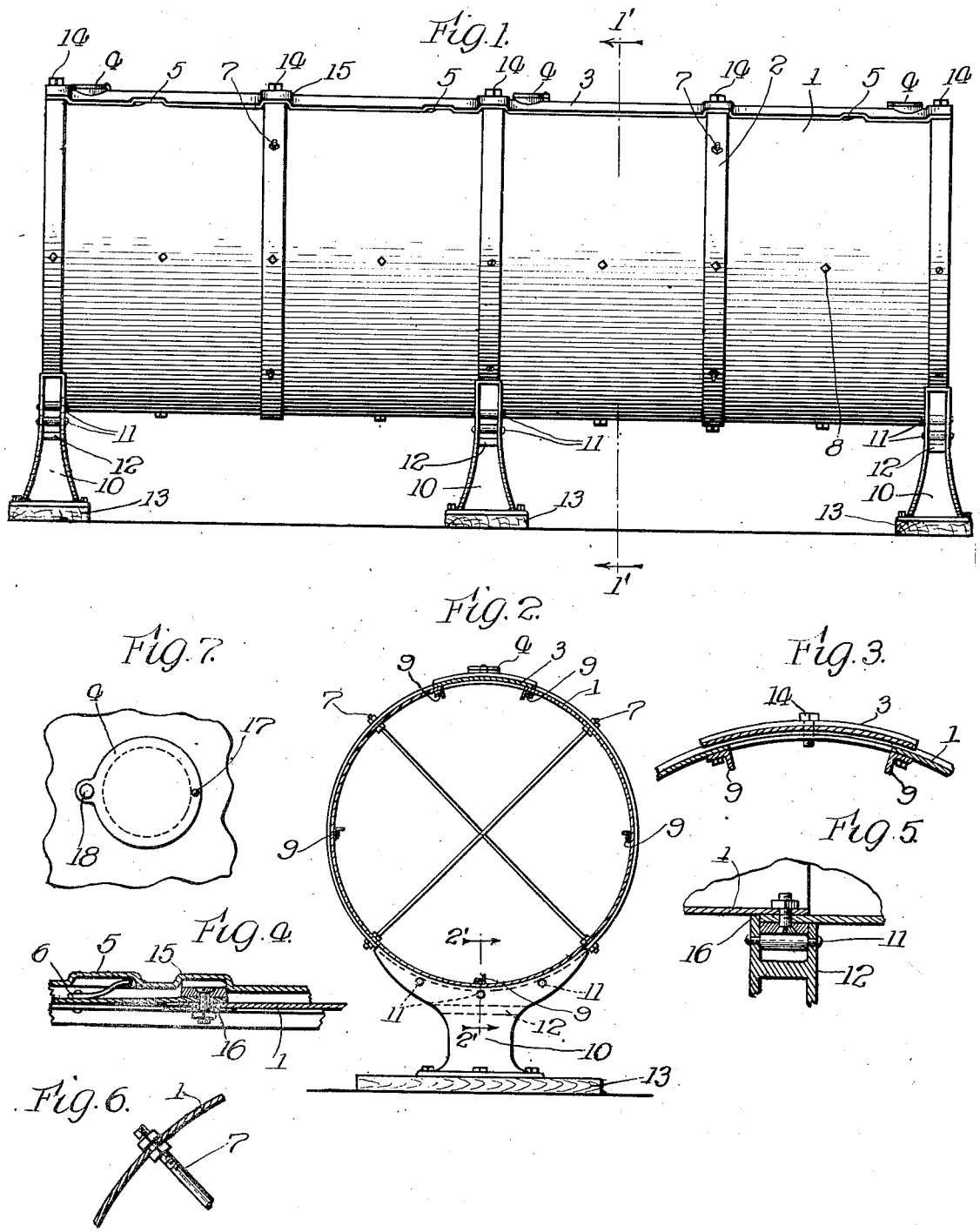
Witnesses:
A. J. Sauser
R. Burkhardt
Inventor:
Darius T. Phillips Patented Jan. 30, 1923.

1,443,500

UNITED STATES PATENT OFFICE.

DARIUS T. PHILLIPS, OF CHICAGO, ILLINOIS.

GRAIN BIN.

Application filed April 28, 1919. Serial No. 293,193.

*To all whom it may concern:*

Be it known that I, DARIUS T. PHILLIPS, a citizen of the United States, residing at Chicago, in the county of Cook and State of Illinois, have invented certain new and useful Improvements in Grain Bins, of which the following is a specification.

My invention relates to improvements in grain bins, and it is the primary object of the invention to provide an improved bin or container for grain and the like which may be moved across a field, or on a road, and when filled to market, thereby saving the handling of the grain several times, and the accompanying waste and expense.

It is one of the chief objects of the invention to provide a grain bin for farm use which will be proof against vermin such as rats and mice, that is light and convenient for transportation and handling, and can be loaded upon a wagon or other conveyance for the purpose of marketing the grain or for being moved from one location to another and receiving the grain direct from the threshing machine.

Another important feature of my invention is that it is cylindrical in form, being supported on roller bearing supports which permit the turning of the bin when filled, thereby thoroughly aerating the contents, and expediting the drying out of any damp grain contained therein. This prevents the heating and consequent deterioration of grain, a frequent occurrence in the ordinary farm granaries.

A further object of the invention is to provide an improved construction in a grain bin, by making it entirely of steel or other analogous material, so that a fire may be built under it, facilitating the drying of the grain if necessary, thus providing the farmer with a kiln drier.

A still further object of the invention is secured by constructing my improved bin in sections, each of which may for example conveniently contain fifty bushels of grain, said sections being easily joined together, and making one large bin, the aggregate maximum of which might conveniently approximate five hundred bushels or more.

Another object of the invention is to furnish the farmer with a simple and inexpensive means for permanently storing his grains.

Other objects of the invention are to be found in the special arrangements of parts hereinafter more fully described, shown in the accompanying drawings and set forth in the appended claims.

In the said drawings Fig. 1 is a side view of the complete granary, resting on its supports; Fig. 2 is a sectional view taken on line 1'—1' of Fig. 1 in the direction indicated by the arrows; Fig. 3 is a fragmentary sectional view through the cover of the grain bin, when closed; Fig. 4 is a detail sectional view showing the cover partly raised; Fig. 5 is a detail sectional view of a roller support, taken on dotted line 2'—2' of Fig. 2 in the direction indicated by the arrows; Fig. 6 is a detail view of a brace rod showing the manner of fastening same to the wall of the structure; Fig. 7 is a detail view of one of the caps on the cover.

My improved grain bin is preferably cylindrical in form and is comprised of a plurality of sections, the walls of which are designated generally by the reference character 1, the sections being joined together by suitable peripheral strengthening bands 2, bolted to each section by the brace rods 7, (see Figs. 2 and 6) which preferably extend diametrically of the bin and so that each rod is perpendicular to its adjacent rod, as shown in Fig. 2.

The sections 1, are constructed so that they may be telescoped or overlapped as indicated in Fig. 1 and more clearly in Figs. 2 to 5 inclusive, and the overlapping portions are perforated so that suitable retaining bolts may be passed therethrough as shown by the bolt through the lapped portions of the sections indicated by the reference character 16 in Fig. 4. By making these sections 1 of a substantially uniform character, I may join any number of them together in the manner illustrated in Figs. 1 and 4, and prefer also to use the retaining bands or hoops 2, which are also perforated not only to take the short bolts as indicated in Fig. 4, but also to have passed therethrough the diametrically positioned stay rods 7 which may be used for strengthening the bin and preventing any tendency toward collapsing of same, especially when it is considerably elongated by the joining together of a plurality of sections.

The material of the sections 1 is cut away so that a sector of each section is missing and these cut away portions or gaps are intended to be arranged in the assembled bin in alinement so that there will be a continuous opening from end to end in the cylindrical wall of the bin to be covered by a suitable cover member as indicated generally by the reference character 3, this cover 3 being removable in order to provide an opening through which grain may be introduced into the bin, this opening, however, being spanned by the encircling bands or hoops 2 which afford a means for detachably securing the cover 3 to the bin.

The construction and mode of operation of the cover 3 is as follows:

The cover is preferably made of pressed sheet metal and the body portion thereof is made in an integral piece with indentations at spaced intervals adapted to register with the hoops or bands 2 which encircle the bin. These indentations will be apparent from an inspection of the views of the cover shown in Figs. 1 and 4. The cover is intended to be of a form that will completely close the opening in the normal top of the bin, and provision is made for tightly clamping the cover on the bin by means of the bolts 14 passed through openings in the cover and threaded into co-operating openings in the hoops or bands 2. The cover 3 is preferably provided with a plurality of small openings $3^a$ intended to permit grain to be withdrawn therethrough from the interior of the bin through the cover 3 when the bin is sufficiently rotated. These openings $3^a$ may be of any desired size as indicated by the relative sizes of the parts in Figs. 1, 2 and 7, and covers 4 are provided for such openings, the same being pivoted to the material of the cover by pins 18, the covers being locked in their normal closed position by detachable pins or screws 17 passed through registering holes in the covers 4 and 3 respectively.

It will be seen that my improved bin is rotatably mounted on the supports 10 and when the bin is full of grain, it may be emptied by withdrawing quantities of grain as desired through the openings $3^a$ of the cover 3 closed by the small pivoted covers 4.

It is an important feature of my invention that the cover 3 is provided with special means by which the circulation of air may be admitted into the interior of the bin to carry off any heated air therein and to aerate the grain in the bin thus avoiding excessive heating and damage to grain, especially grain that is more or less fresh from thrashing and apt to undergo heating, or any grain in fact that is damp or contains excessive moisture from any cause whatsoever. In order to provide means for thoroughly aerating the interior of the bin, I provide a plurality of housings 5 (Figs. 1 and 4), the same being formed integrally out of the material of the cover preferably near the lateral edges thereof and at the ends of the cover. Co-operating with each of these integral housings in the cover, is a leaf spring 6 secured to the adjacent portion of the wall of the bin section 1, the deflected ends of the springs 6 being arranged to engage the cover 3 in the interior of the housings 5 and normally tend to elevate the cover so that whenever the threaded securing bolts 14 are loosed or partly withdrawn, the springs 6 will tend to elevate the cover as desired to whatever extent the bolts 14 are withdrawn up to the limit of the flexibility of the springs which I prefer to construct so that the covering may be raised to the maximum of two or three inches if desired. The cover 3 will be constructed as shown in Figs. 1 and 3 so as to overlap both the ends and sides of the opening in the bin as a protection against the admission of rain or snow when the cover 3 is elevated for aerating purposes as well as locked in its normal closed position. This construction of the cover, it will be apparent, will provide a protection against the elements for the grain on the interior of the bin so that the bin may be exposed or even stored in the open and whenever it is desired to aerate the contents of the bin, it will only be necessary for the bolts 14 to be withdrawn or loosed to whatever extent may be desired, as the cover will automatically follow the withdrawal of the heads of the bolts 14.

It will be seen that a bin constructed of the sections 1 as described, will be capable of having its capacity changed by the addition of extra sections according to the needs of the user, and that when it is desired to market the grain or to transport it for any reason from one locality to another, the cover 3 may be closed and the bin easily rolled or otherwise loaded on a suitable means of conveyance, the cylindrical shape of the bin facilitating such loading and unloading. The openings in the cover plate closed by pivoted cover members 4, afford the preferred means of withdrawing comparatively small quantities of grain, but if it is desired to empty the entire bin, as for example at an elevator or storage granary, the complete process of emptying the bin may be facilitated by removing the cover 3.

An important feature of the invention resides in the cylindrical shape of the bin which facilitates handling and also enables me to provide convenient means for supporting the bin in the manner illustrated in Figs. 1 and 2, the same consisting of two or more stands indicated generally by the reference character 10. These stands are provided with an upper portion arcuate in shape adapted to co-operate with the cylindrical outer surface of my bin, or more accurately speaking with the hoops or bands 2 thereof, and the arcuate upper portion of the stands 10 is provided with a plurality of anti-friction rollers 11 co-operating with said bands, which enable the bin not only to be supported upon said stands in a permanent and safe manner, but the rollers 11 enable the bin, when filled with grain, to be easily turned by the hand of an operator so that grain in quantities as desired, may be withdrawn through the holes closed by the covering plates 4. Another important object of rotatably mounting the bin in the manner described is that when rotated on the rollers 11, the contents of the bin will be shifted throughout the bin, thus resulting in a thorough intermixture of air in the interior of the bin and, also aerating the grain whenever the bin is only partly filled, and even though the bin be approximately full, it is found that rotating of the bin on the supports and the consequent agitation is advantageous. This agitating action on the interior of the bin is facilitated not only by the diametrically arranged struts or supports 7 before referred to, but I also provide longitudinally arranged angle bars spaced at convenient distances around the periphery of the bin as indicated by reference character 9, Figs. 2 and 3. It will be seen that two of these angle irons 9 are preferably placed adjacent the opening over which the covering 3 is placed, same being located near the cover opening for strengthening purposes.

The stands or supports 10 may be of any desired construction to provide means for supporting the rollers 11 in an arcuate relation, but for economy and convenience in manufacturing, I prefer that the body portions be formed of either hollow castings or pressed metal with foot portions that may be bolted to base members 13 as shown in detail in Figs. 1, 2 and 5.

The diametrically arranged struts or supports 7 are preferably screw threaded to take nuts on the interior and exterior of the bin as illustrated in Fig. 6, and by means of this adjustment, the circular shape of the bin may be secured and maintained.

By making the bin and the supports therefor of iron or steel, as illustrated and described, I find it is also feasible to use the invention as a drier, as heat may conveniently be employed by building a fire beneath the bin or otherwise applying heat thereto.

I claim:

1. A bin comprising a plurality of substantially cylindrical shaped sections placed end to end in overlapped relation to form a container, hoops passing around the container and overlying the overlapped portions of said section, and brace rods passing through said hoops and overlapped portions at diametrically opposite sides of the container.

2. The combination with a bin of cylindrical form having a hollow interior accessible through an opening in the wall of the bin, of a detachable cover adapted to close said opening, means for locking said cover on the bin to close the said opening in the wall thereof, said means comprising a plurality of bolts or screws passing through registering openings in the said cover and in the bin whereby the cover may also be released from close contact with the bin without being detached therefrom, a spring means interposed between the cover and the wall of the bin whereby to elevate the cover in relation to the wall of the bin whenever the lock or securing means is released to permit the said cover to be raised.

3. The combination in a bin comprising a plurality of cylindrical sections of sheet metal overlapped at their contiguous ends and joined together to form an inter-communicating compartment, there being sectors in the peripheries of each of said sections cut away to form a substantially continuous slit in the wall of the bin and extending longitudinally from end to end thereof, a plurality of hoops extending peripherally of the said bin adjacent the joints between the said sections thereof and covering the same, the said hoops also spanning the said longitudinally extending opening in the bin, and a cover for the said opening in the bin formed to overlap the edges of said opening and to completely close the same, means for locking said cover in its closed position and also for releasing the cover and permitting it to be moved radially away from the opening in the wall of the bin without becoming detached therefrom, and elastic means adapted to force the cover radially from the opening in the wall of said bin.

4. The combination in a bin comprising a plurality of sheet metal sections of cylindrical form joined together to form a bin of elongated cylindrical form, a plurality of hoops passing peripherally around the said bin, there being one of said hoops for each of the joints between adjacent sections of the bin and covering the said joints, there being also a longitudinally extending opening in the wall of the bin spanned by the said peripheral hoops, a cover for said opening, means for locking the said cover over the said opening in the said bin, and means for withdrawing grain or other granular material from the bin, comprising a pivoted cut-off member adapted to close an opening in the said cover.

5. The combination in a bin of cylindrical form having a hollow interior accessible through an opening in the wall thereof, of a detachable covering for the said opening, a plurality of portable supports having anti-friction devices upon which the bin is adapted to be mounted for rotation, a pair of flanges on each of said portable supports and spaced apart with the said anti-friction devices therebetween, a plurality of hoops extending peripherally around the bin and being secured thereto, the said hoops being adapted to engage the said anti-friction devices on the portable supports with the flanges on the latter engaging the lateral edges of said hoops to retain said hoops in engagement with said anti-friction devices during the rotation of the bin.

6. The combination in a bin comprising a plurality of cylindrical sections of sheet metal overlapped at their contiguous ends and joined together to form an intercommunicating compartment, there being sectors in the peripheries of each of the said sections cut away to form a substantially continuous slit in the wall of the bin and extending longitudinally from end to end thereof, a plurality of hoops extending peripherally of said bin adjacent the joints between the said sections thereof and covering the same, the said hoops also spanning the said longitudinal extending slit in the bin, and tie rods extending through said hoops, and overlapped portions at diametrically opposite sides of the bin.

In testimony whereof I have signed my name to this specification, in the presence of two subscribing witnesses, on this 24th day of April, A. D. 1919.

DARIUS T. PHILLIPS.

Witnesses:
MARY ANN THORPE,
ELIZABETH I. SMITH.